United States Patent [19]

Johnston

[11] 4,397,300
[45] Aug. 9, 1983

[54] CLOSED LOOP SOLAR COLLECTOR SYSTEM WITH DUAL CHAMBER FLUID SUPPLY ARRANGEMENT

[76] Inventor: Barry W. Johnston, 1622 Que St., NW., Washington, D.C. 20009

[21] Appl. No.: 368,083

[22] Filed: Apr. 13, 1982

Related U.S. Application Data

[60] Division of Ser. No. 146,424, May 5, 1980, Pat. No. 4,354,483, which is a continuation-in-part of Ser. No. 43,799, May 30, 1979, Pat. No. 4,286,579.

[51] Int. Cl.³ .............................................. F24J 3/02
[52] U.S. Cl. ................................... 126/419; 126/433; 126/438
[58] Field of Search ............... 126/433, 434, 435, 436, 126/438, 437, 419, 422

[56] References Cited

U.S. PATENT DOCUMENTS

| | | | |
|---|---|---|---|
| 2,486,833 | 11/1949 | Freund | 126/437 |
| 3,178,113 | 4/1965 | Curry et al. | 126/435 |
| 3,390,672 | 7/1968 | Snelling | 126/433 |
| 4,061,131 | 12/1977 | Bohanon | 126/433 |
| 4,110,986 | 9/1978 | Tacchi | 126/433 |
| 4,220,138 | 9/1980 | Bottum | 126/433 |
| 4,241,784 | 12/1980 | Tacchi | 126/433 |
| 4,246,890 | 1/1981 | Kraus et al. | 126/433 |
| 4,270,521 | 6/1981 | Brekke | 126/433 |
| 4,286,579 | 9/1981 | Johnston | 126/438 |

FOREIGN PATENT DOCUMENTS 2601673 7/1977 Fed. Rep. of Germany ...... 126/433

Primary Examiner—James C. Yeung

[57] ABSTRACT

A closed loop solar collector system includes a linear concentrating parabolic reflector, a linear vaporizer tube horizontally aligned along the focal line of the parabolic reflector, and a fluid metering assembly attached to the input end of the vaporizer tube for precisely metering a quantity of a vaporizable heat transfer fluid from a supply tank to the vaporizer tube. Solar energy concentrated by the parabolic reflector on the vaporizer tube vaporizes the heat transfer fluid. The heated vapor flows out the outlet end of the tube opposite the fluid metering assembly through a pipe and enters a heat exchanger. The heat exchanger contains a heat absorptive medium which absorbs heat from the vaporized fluid to cause the fluid to condense and release its latent heat of vaporization to the heat absorptive medium. The condensed fluid flows back to the heat storage tank for re-use under pressure provided by the vaporized fluid entering the heat exchanger.

7 Claims, 6 Drawing Figures

CLOSED LOOP SOLAR COLLECTOR SYSTEM WITH DUAL CHAMBER FLUID SUPPLY ARRANGEMENT

CROSS REFERENCE TO RELATED APPLICATION

This application is a division of pending application Closed Loop Solar Collector System With Dual Reservoirs and Fluid Bypass, Ser. No. 146,424, filed May 5, 1980, now U.S. Pat. No. 4,354,483, which is a continuation-in-part of Closed Loop Solar Collector System, Ser. No. 043,799, filed May 30, 1979, now U.S. Pat. No. 4,286,579.

TECHNICAL FIELD

The invention here presented is broadly in the art of solar energy collectors. More specifically, it is concerned with a closed loop solar energy collecting system and improvements devised to increase the efficiency of the operation of the system.

BACKGROUND ART

A closed loop solar energy collecting system has been described in my U.S. Pat. No. 4,286,579, issued Sept. 1, 1981. The system includes a concentrating reflector, vaporizer means at the focal point of the reflector, a fluid metering assembly attached to the input end of the vaporizer means for precisely metering a quantity of a vaporizable heat transfer fluid from a supply tank to the vaporizer means, a heat exchanger, and a fluid storage reservoir. Solar energy concentrated by the reflector on the vaporizer means vaporizes the heat transfer fluid. The heated vapor flows out the outlet end opposite the fluid metering assembly through a pipe and enters a heat exchanger. The heat exchanger contains a heat absorptive medium which absorbs heat from the vaporized fluid to cause the fluid to condense and release its latent heat of vaporization to the heat absorptive medium. The condensed fluid flows to the heat storage tank and back to the supply tank for reuse. The recirculation is provided under pressure generated by the vaporized fluid entering the heat exchanger. The heat exchangers are modular and a plurality may be interconnected to provide a desired amount of heat storage capacity.

During operation of such a system, several conditions may result which detract from the operating efficiency of the system. Since the pressure of the vaporized fluid moves the condensed heat transfer fluid from the storage reservoir back to the fluid supply, conditions which dissipate the pressure tend to reduce the rate of return of the condensed heat transfer fluid back to the fluid supply. One such condition is the overall volume of the operating portions of the closed loop system. At times, a temporary reduction of the volume of the operating portions of the system is desired to lessen pressure dissipation in order to assure adequate return of condensed heat transfer fluid to the fluid supply tank.

Another condition which reduces the operating efficiency of the system occurs when extremely favorable sun conditions cause the linear vaporizer tube to heat up to a very high temperature. Concomitant with the very high temperature is a high pressure. The excessive heat conditions may cause the linear vaporizer tube to overheat or rupture.

Another condition which contributes to overall efficiency is heat loss that results in the fluid supply tank. As hot fluid in the tank awaits being metered into the linear vaporizer tube, it tends to lose some of its heat to its surroundings.

Yet another condition which contributes to system inefficiency is the cooling and loss of heat from the heat transfer fluid to the outside surroundings of the system during conditions of low solar energy capture such as in the evening when the sun goes down or on cloudy days.

A thermoelectric generator system deriving its motive heat from solar energy, should make most efficient use of the solar energy which is collected and stored.

It is accordingly an object of the present invention to provide a fluid supply tank designed to reduce heat loss from the heat transfer fluid to the surroundings.

Another an object of the invention to provide a closed loop solar energy collector system of improved operating efficiency having means to temporarily reduce the volume of the operating system in order to enhance ability of the pressure of the vaporized heat transfer fluid to move condensed heat transfer liquid back to the fluid supply.

Another object of the invention is to provide a means to quench the linear vaporizer tube when subject to excessively high operating temperatures and pressure.

Another object of the invention is to provide a means for transferring a large portion of the heat transfer fluid away from the outside environment to portions of the system which are protected from the outside environment during low solar energy accumulating times such as after sundown or on cloudy days.

Another object of the invention is to provide a combined solar energy collecting and electric energy generating system which makes efficient use of the solar energy collected.

These and other objects are accomplished by the invention as described below.

DISCLOSURE OF INVENTION

A basic closed loop solar energy collecting system having a fluid supply tank, a fluid metering system, a linear concentrating parabolic reflector, a linear vaporizer tube horizontally aligned along the focal line of the parabolic reflector, a heat exchanger, and a heat transfer fluid storage reservoir is provided with improvements designed to increase operating efficiency. Although the linear parabolic reflector and the vaporizer tube have been shown and described as the preferred embodiment, it should be understood that other collectors may be used, such as a circular reflector and centrally located vaporizer bulb, or even a flat plate-type collector.

In accordance with the invention, the fluid supply tank is partitioned into two fluid supply chambers having a valved orifice connecting the two chambers. The valve is dependent upon the level of heat transfer fluid in the first chamber. When the level of the heat transfer fluid is high enough in the first chamber, the valve connecting the two chambers is closed. The heat transfer fluid contained in the second chamber is sequestered from the operating system. The heat transfer fluid in the first chamber circulates through the operating system rapidly. Its residence time in the first chamber is relatively short thereby lessening heat loss from the heat transfer fluid to the surroundings. When the level of heat transfer fluid in the first chamber drops, the valve between the two chambers opens thereby allowing the contents of the second chamber to enter the operating system.

The novel features characteristic of the various aspects of the invention as to their organization and method of operation, will best be understood by the description presented below when read in connection with the accompanying drawings. Although the description presented below relates especially to the embodiments of the invention illustrated in the drawings, this description is not intended to limit the scope of the invention which is defined in the claims.

BEST MODE FOR CARRYING OUT THE INVENTION

Figure 1:
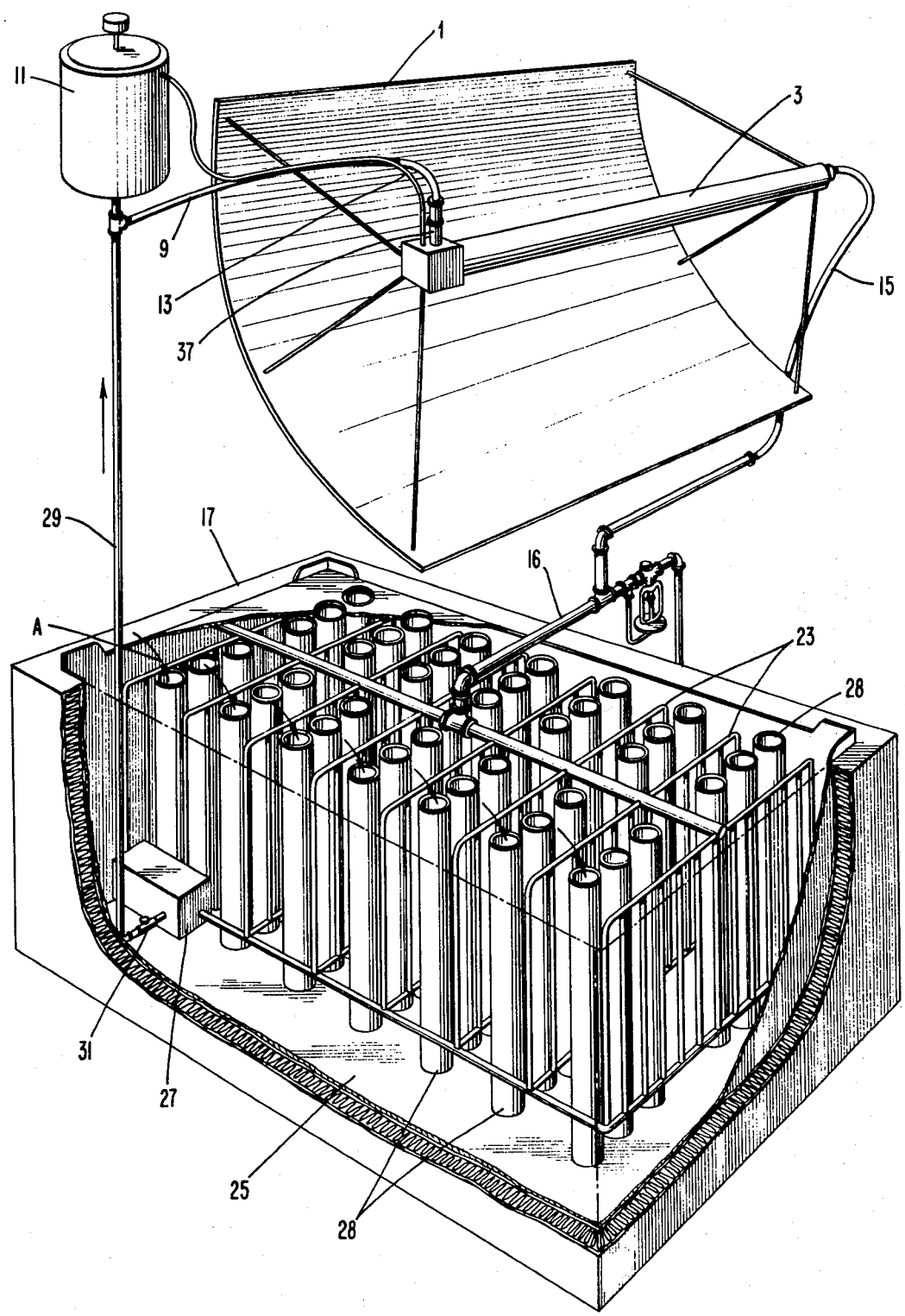
FIG. 1 shows a perspective view of the overall solar collector system.

With reference to FIG. 1 showing a perspective view of the overall solar collector system, linear concentrating parabolic reflector 1 concentrates captured solar energy onto linear, fluid receiving vaporizer tube 3 which is disposed along the focal line of the reflector. Fluid supply tank 11 is connected to the linear vaporizer tube 3 by hose 9. Pressure equalizing hose 13 runs from tank 11 to receiver 3, also. Fluid metering valve 37 is attached to the linear receiver 3 and precisely meters heat transfer fluid from the fluid supply tank 11 to the linear receiver 3. The outlet end of the receiver 3 is connected to heat exchanger 17 by means of conduit 15 and pipe 16.

In heat exchanger 17, heat exchange channels or manifolds 23 allow transfer of heat from the heat transfer fluid to heat absorptive medium 25 inside the heat exchanger 17. A number of secondary fluid transfer channels 28 are disposed within heat absorptive medium 25 and allow a flow of heat extraction fluid, such as air, therethrough as shown by arrows A. The heat extraction fluid absorbs heat from the absorptive medium of the heat exchanger. The secondary heat extraction fluid can also be water or another fluid and used, for example, to heat a home or office building, heat water, operate the vaporization cycle of an air conditioning unit, or power a thermoelectric generator.

Of course, many other uses of the heat extracted and stored by medium 25 will occur to those skilled in the art. The heat exchange mediums can be a wide variety of known materals.

Condensed heat transfer fluid flows from heat exchange channels 23 and enters heat transfer fluid reservoir 27. Condensed heat transfer fluid from reservoir 27 is forced upwardly in the system under pressure generated in the vaporizer tube 3 through pipe 29 and into fluid supply tank 11. A one-way gate or check valve 31 is disposed in pipe 29 to prevent backflow of fluid from tank 11. The fluid in tank 11 is ready for reuse in the closed loop solar collector system.

The heat from the closed loop solar collector system described above, can be used, for example, to heat air or water for domestic space or hot water heating systems, to power the vaporization cycle of an air conditioning unit, or to power a thermoelectric generator. It is this basic system that forms the foundation for the improvement features of the present invention, as will now be described.

Figure 2:
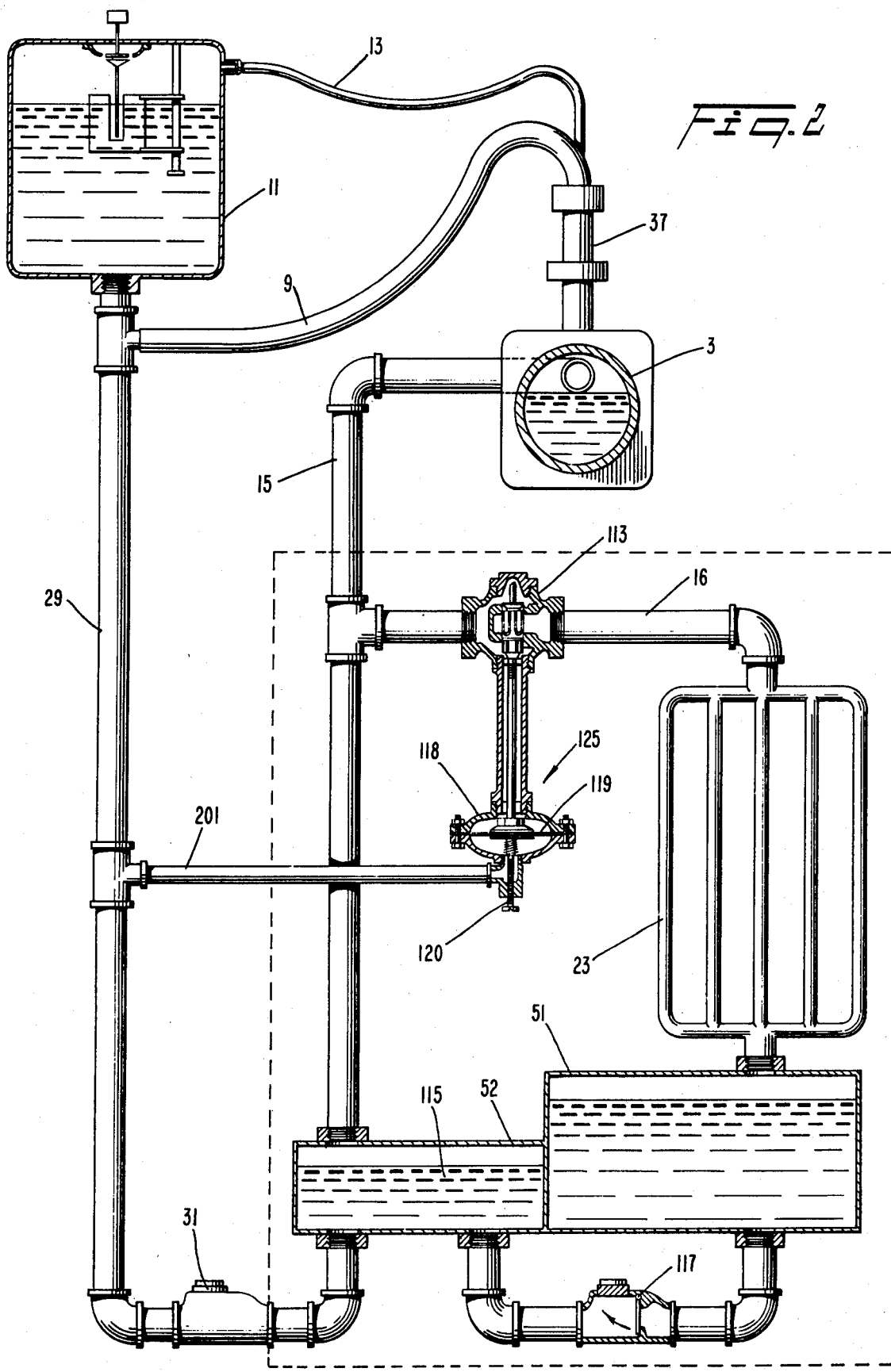
FIG. 2 shows an embodiment of the invention having a two-part fluid storage reservoir. The system is in the operating mode.

The first improvement feature or aspect of the solar collector system of the present invention, is shown in FIG. 2. Valve means 113 is disposed within pipe 16 which is connected to the linear vaporizer tube 3 and to the heat exchange channels 23. The valve 113 is controlled by a pressure-differential sensing means 125 which is comprised of chamber 118, diaphragm 119, and adjustment screw 120. The valve 113 operates in response to the pressure difference between the vaporized heat transfer fluid from valve 113 exerted on the topside of diaphragm 119 and the condensed heat transfer fluid, transmitted through pipe 201, on the bottomside of diaphragm 119. When the pressure of the condensed fluid is less than a predetermined level, the amount of fluid in fluid supply tank 11 is low. When this condition is sensed, valve 113 closes, thus terminating fluid flow to the heat exchange channels 23 and the first heat transfer reservoir 51 connected thereto. Because of the temporary reduction of the volume of the operating system, the pressure of the vaporized fluid has greater effect in circulating the condensed heat transfer fluid through the system.

A second heat transfer fluid reservoir 52 is connected between the fluid supply tank 11 and the linear vaporizer tube 3. It is additionally connected to the first heat transfer fluid storage reservoir 51 with one-way gate or check valve 117 disposed between the two fluid storage reservoirs. When valve 113 shuts off heat exchange channels 23 and first fluid storage reservoir 51, the pressure of the vaporized heat transfer fluid acts directly upon the condensed heat transfer fluid 115 stored in reservoir 52 to move it into fluid supply tank 11. As the level of condensed fluid builds up in tank 11, the pressure of the condensed fluid on the bottomside of diaphragm 119 of pressure sensor 25 increases. At a predetermined pressure differential, valve 113 opens reopening heat exchanger channels 23 and fluid reservoir 51 to the operating system.

Figure 3:
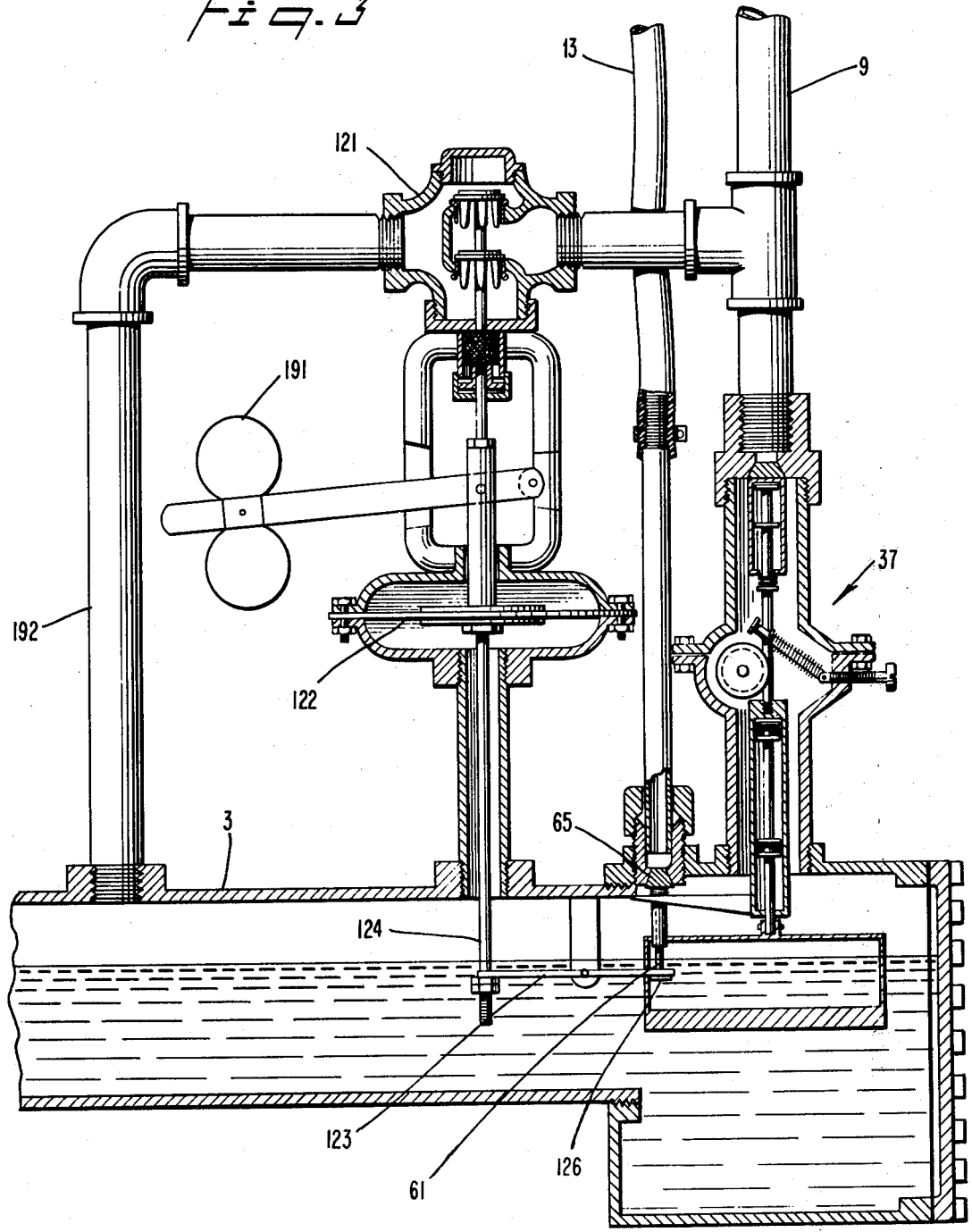
FIG. 3 shows a pressure-controlled valve designed to allow bypass of the fluid metering assembly.

In FIG. 3, a pressure-controlled valve 121 allows bypass of fluid metering assembly 37 when excessive pressure and temperature conditions develop in linear receiver tube 3, such as when solar energy input conditions are very favorable. Valve 121 is actuated by pressure differential sensing diaphragm 122. Pressure exerted by the vaporized heat transfer fluid is exerted on the bottomside of diaphragm 122. Pressure exerted by weight 191 is exerted on the topside of diaphragm 122. At a predetermined pressure differential, valve 121 is actuated allowing condensed heat transfer fluid to flow from supply tank 11 (see FIG. 1), through conduit 9, through valve 121, through pipe 192, and into receiver 3, thereby bypassing fluid metering assembly 37. Upon receiving condensed heat transfer fluid from supply tank 11 at a rapid rate, the excessive pressure and temperature conditions in receiver tube 3 are quenched.

Rod 124 is attached to the valve stem and diaphragm 122 and serves to open valve 65 which is disposed between pressure equalizing hose 13 and receiver 3. Particularly, rod 124 is connected to pivotal lever arm 123 which forces plunger blocker 126 of the plunger 61 down, opening valve 65 when diaphragm 122 moves upward as a result of high pressure in receiver 3.

Figure 4:
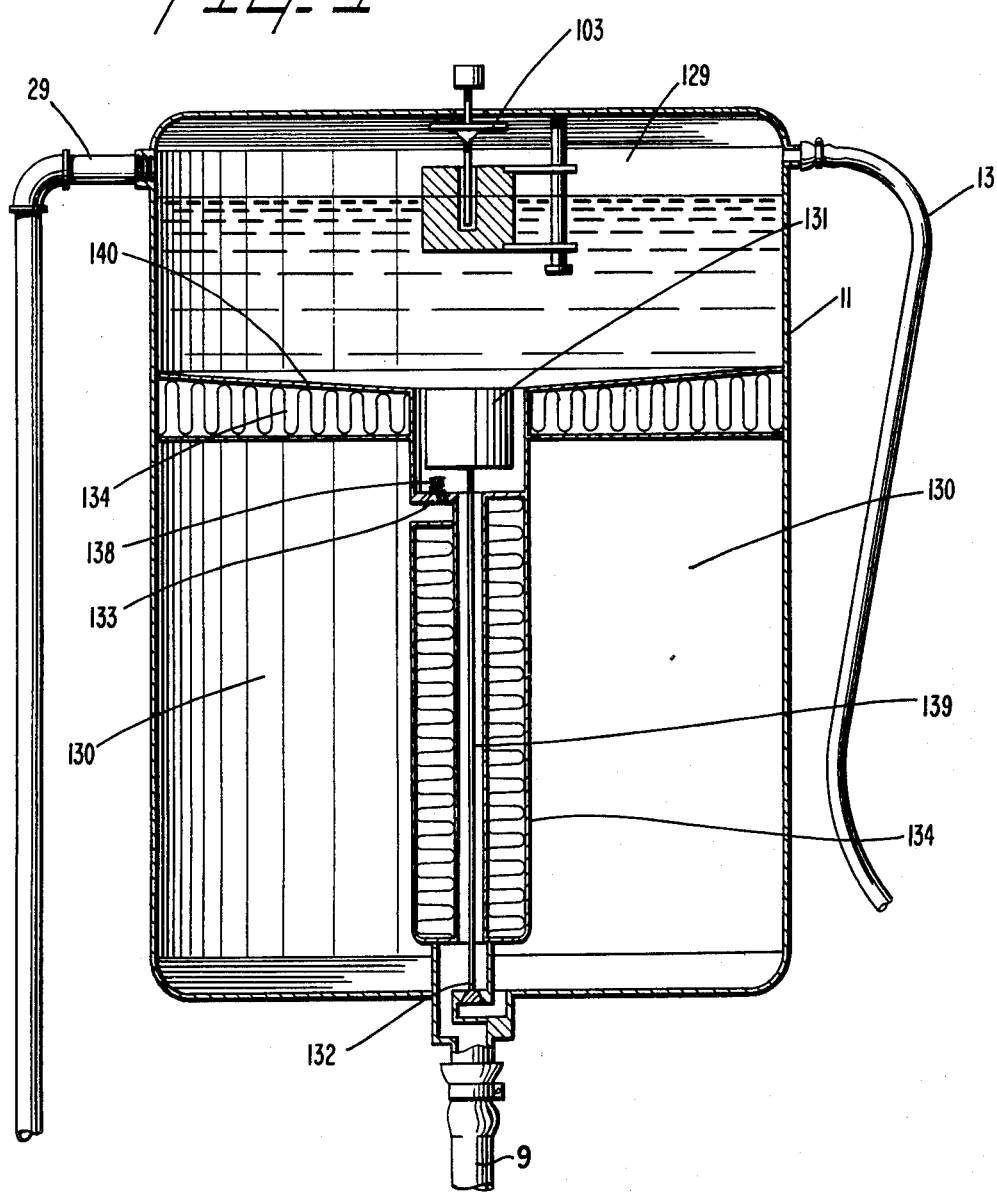
FIG. 4 shows a fluid supply tank having two partitioned supply chambers.

In FIG. 4, fluid supply tank 11 is partitioned into a first supply chamber 129 and a second supply chamber 130. Valve 133 is responsive to the level of condensed heat transfer fluid in first supply chamber 129. When the level of the fluid in chamber 129 is sufficient, float 131 is buoyed up by the fluid. However, when the level of fluid lowers sufficiently, float 131 is no longer buoyed up; it then rests on spring-biased rod 138, thereby opening valve 133 and allowing communication between first supply chamber 129 and second supply chamber 130. Float 131 may be connected by rod 139 to valve 132 which controls flow of condensed heat transfer fluid from second supply chamber 130 to conduit 9 connecting the fluid supply tank 11 to the fluid metering assembly 37 (see FIG. 1).

When first supply chamber 129 is emptied, float-controlled breather valve 103 is opened; valve 133 is opened; and valve 132 is opened. Fluid may then flow from second supply chamber 130 into conduit 9 without a vacuum being created in chambers 129 and 130 due to displaced fluid. Atmospheric air enters chambers 129 and 130 through valves 103 and 133, respectively. When fluid returns to the fluid supply tank 11 in sufficient quantity, second supply chamber 130 fills up first, followed by first supply chamber 129.

In most operating circumstances, first supply chamber 129 has sufficient condensed heat transfer fluid to preclude the fluid in second supply chamber 130 from entering the operating system. This is desireable because the smaller amount of fluid in first chamber 129 circulates through the operating system in considerably less time than would the larger amount of fluid retained in second chamber 130. By having a reduced residence time in first supply chamber 129, the hot, condensed transfer fluid entering first supply chamber 129 undergoes less heat loss to the surroundings of the fluid supply tank. Less heat loss to the surroundings increases the efficiency of the operating system. The partition 140 between the first and second supply chambers may be provided with insulation 134 to further reduce heat loss.

Figure 5:
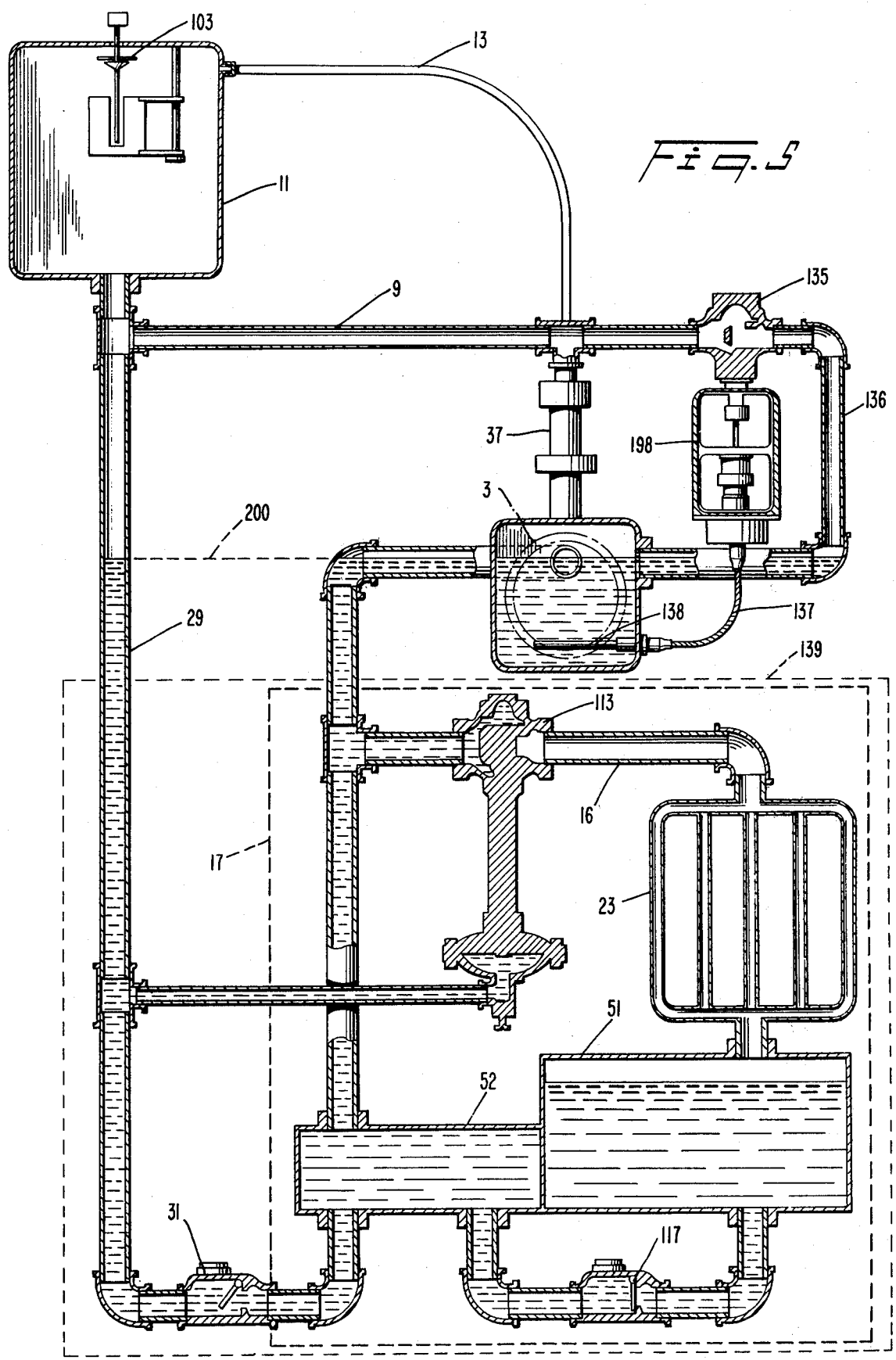
FIG. 5 shows an embodiment of the invention having a temperature-responsive valve which opens and drains the fluid supply tank to the remainder of the system. The system is shown in the shut down mode.

In FIG. 5, valve 135 controls flow through conduit 136 which serves to connect fluid supply tank 11 with linear vaporizer tube 3, thereby bypassing fluid metering assembly 37. Valve 135 is controlled by a standard temperature-responsive control means 198 connected by tube 137 to temperature sensor 138. Under normal operating circumstances, the temperature of the heat transfer fluid in linear vaporizer tube 3 which is sensed by sensor 138 is sufficiently high so as to keep valve 135 closed. However, during times of decreased solar energy input, such as during cloudy days or after sundown, valve 135 is opened as a result of the lower threshold temperature being sensed by sensor 138. When valve 135 opens, heat transfer fluid drains from fluid supply tank 11 to the linear vaporizer tube 3 and to the rest of the system including heat exchange channels 23 and condensed fluid storage reservoirs 51 and 52. Fluid level 200 approximates the level of the heat transfer fluid after valve 135 opens and the heat transfer fluid is dumped from tank 11.

The overall solar collector system is designed so that only a minimal portion of the system is placed outside the confines of the building 139 or other structure that the system services. By shifting as much heat transfer fluid to the building as is possible during times when solar energy input to the system is low, heat loss from the heat transfer fluid to the outside surroundings is kept to a minimum.

Figure 6:
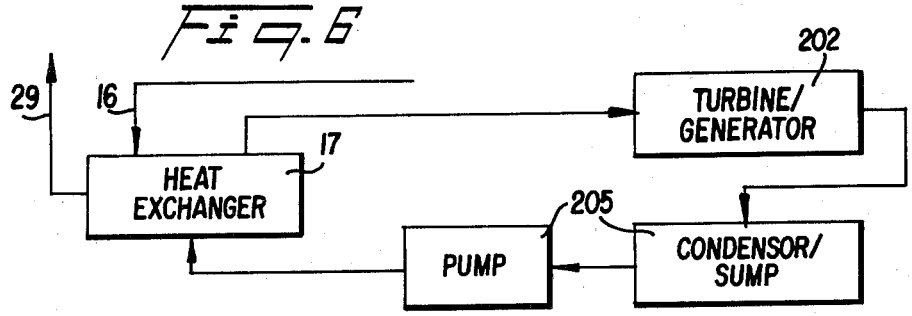
FIG. 6 is a schematic diagram of the thermoelectric generating system of the invention.

For a combined solar energy collecting and electric generating system, a closed loop solar collecting system such as described above and shown in the drawings, may be employed in conjunction with an electric generating system which includes a working-fluid-powered turbine/generator 202 (see FIG. 6). The working fluid is preferably ammonia, which is in heat exchange communication with the heat exchanger 17 by passing through channels 28 (FIG. 1) of the solar collecting system. The heat exchanged from the heat exchanger 17 generates the working vaporized, high enthalpy fluid which drives the turbine/generator 202. A condenser/sump and a return pump 205 may be provided to complete this secondary or working electric generating system (FIG. 6).

In view of the foregoing, it is readily apparent that the closed loop solar collector system of the present invention, is a significant improvement over the basic system. Dual reservoirs 51, 52 and a bypass valve 113 effectively limit the operating volume of the system to assure proper operating pressure for return of fluid to the supply tank 11. Secondly, the bypass valve 121 assures a rapid quench of the vaporizer tube 3 when overly favorable solar conditions tend to over-heat the system. On the other hand, during times of low heat input the valve 135 opens to bypass metering valve 37 thereby removing the fluid from supply tank 11 and connecting lines to minimize heat loss.

A fluid supply tank 11 having dual supply chambers 129, 130 assures sufficient quantity of fluid at all times while limiting the volume during normal operation to also minimize lost heat. Finally, an electrogenerating system is provided utilizing the features of the invention.

In this disclosure, there is shown and described only the preferred embodiments of the invention, but as aforementioned, it is to be understood that the invention is capable of use in various other combinations and environments and is capable of changes or modifications within the scope of the inventive concept as expressed herein.

I claim:

1. A closed loop solar collecting system, comprising:
   (a) a fluid receiver for collecting solar energy;
   (b) fluid supply means connected to supply said receiver with a quantity of vaporizable heat transfer fluid, said supply means including a first chamber having an inlet to receive said fluid and an outlet for discharging fluid to the receiver, a second chamber connecting to supply said receiver when fluid in said first supply chamber reaches a predetermined level, and valve means for providing fluid communication between said first and second chambers when fluid in the first chamber reaches said predetermined level to supply fluid to said second chamber from the first chamber, said valve means being further operable to enable fluid flow to said receiver substantially only from said first chamber when fluid therein is above said predetermined level, thereby circulating a smaller amount of fluid through the collecting system to reduce heat loss;
   (c) means for precisely metering fluid from said supply means to the receiver; and
   (d) heat exchanger means connected to said receiver for absorbing heat energy from fluid vaporized in said receiver, said vaporized fluid condensing after releasing its latent heat of vaporization to the heat exchanger and flowing back to the first chamber in the supply means under pressure provided by the vaporized fluid.

2. A closed loop solar collecting system as described in claim 1 wherein said fluid supply means is a tank valve means is fluid level responsive and includes a float member, a spring member, and a valve member, wherein said valve member is biased by said spring member to prevent fluid communication between said first supply chamber and second supply chamber when said float member is buoyed up by the fluid in said first supply chamber, and wherein the weight of said float member overcomes the bias of said spring member thereby moving said valve member which results in fluid communication between said first supply chamber and said second supply chamber when the level of heat transfer fluid in said first supply chamber is insufficient to buoy up said float member.

3. The system of claim 2, wherein said valve means further includes a second valve member positioned to enable fluid flow from the second chamber to said receiver when fluid in the first chamber reaches said predetermined level.

4. The system of claim 3, wherein said second valve member is interconnected to said valve member with a connecting rod.

5. The system of claim 1, wherein said fluid supply means is divided into said first and second chamber with a partition member containing insulation material, further reducing heat loss.

6. The system of claim 1, wherein said system is operable to enable condensed fluid to return to the supply means under pressure provided by vaporized fluid entering said heat exchange means.

7. The system of claim 1, wherein said first supply chamber includes a normally closed float controlled breather valve positioned to be open when the first chamber is emptied, enabling fluid to flow from said second chamber to the receiver without a vacuum being created in said first and second chamber.

* * * * *